United States Patent [19]

Jensen et al.

[11] Patent Number: 5,013,894
[45] Date of Patent: May 7, 1991

[54] CONDUCTIVE POLYMERIC ARTICLE

[75] Inventors: Per J. T. Jensen, Slangerup, Denmark; George M. J. Gansbuehler, Swindon, England

[73] Assignee: Raychem Corporation, Menlo Park, Calif.

[21] Appl. No.: 241,658

[22] Filed: Sep. 8, 1988

[30] Foreign Application Priority Data

| Sep. 9, 1987 | [GB] | United Kingdom | 8721179 |
| Sep. 9, 1987 | [GB] | United Kingdom | 8721180 |
| Sep. 9, 1987 | [GB] | United Kingdom | 8721181 |
| Oct. 9, 1987 | [GB] | United Kingdom | 8723752 |
| Oct. 9, 1987 | [GB] | United Kingdom | 8723761 |
| Dec. 14, 1987 | [GB] | United Kingdom | 8729120 |
| Dec. 14, 1987 | [GB] | United Kingdom | 8729122 |
| Jun. 21, 1988 | [GB] | United Kingdom | 8814688 |

[51] Int. Cl.$^5$ ............................................. H05B 3/12
[52] U.S. Cl. ..................................... 219/548; 219/505; 174/DIG. 8
[58] Field of Search .............. 219/548, 553, 535, 504, 219/505; 174/92, 93, DIG. 8

[56] References Cited

U.S. PATENT DOCUMENTS

| 1,265,194 | 3/1972 | Cook . | |
| 4,017,715 | 4/1977 | Whitney et al. | 219/553 |
| 4,085,286 | 4/1978 | Horsma et al. | 174/92 |
| 4,421,582 | 12/1983 | Horsma et al. | 156/86 |
| 4,570,055 | 2/1985 | McMills | 219/541 |
| 4,680,065 | 7/1987 | Vansant | 174/DIG. 8 |
| 4,775,501 | 10/1988 | Rosenzweig | 219/535 |
| 4,853,165 | 8/1989 | Rosenzweig et al. | 264/27 |

Primary Examiner—Roy N. Envall, Jr.
Attorney, Agent, or Firm—Timothy H. P. Richardson; Herbert G. Burkard

[57] ABSTRACT

A tubular heat recoverable article comprises electrically conductive polymeric material and can be recovered by passing an electric current therethrough. The article comprises two or more elongate electrodes extending at least part way along the article. One or more of the electrodes are interrupted so that separate lengths of the article can be connected to an electrical power source and heated and or recovered independently.

16 Claims, 1 Drawing Sheet

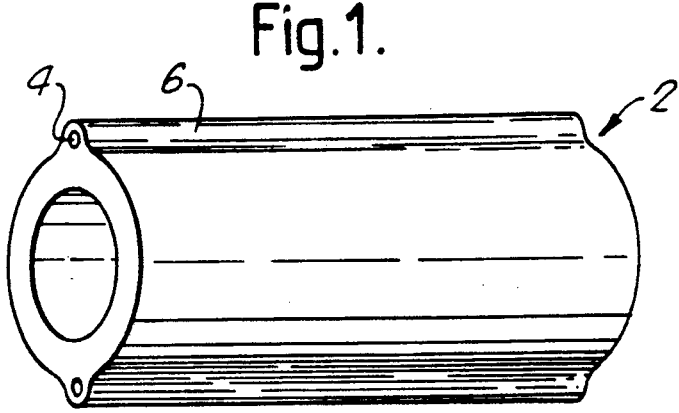
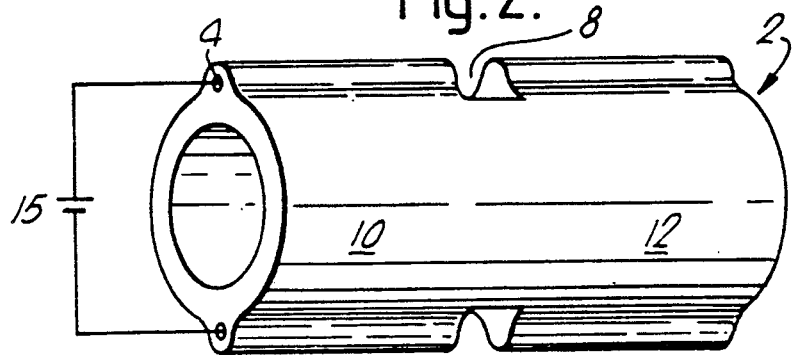
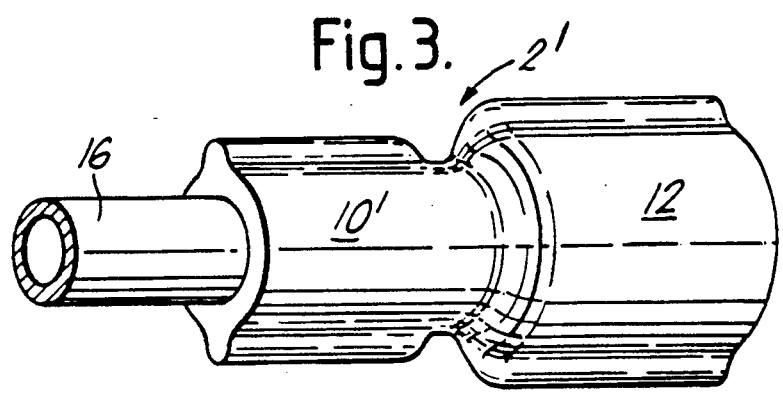

CONDUCTIVE POLYMERIC ARTICLE

This invention relates to an article which comprises a conductive polymeric material, which can be heated by passing electrical current through the conductive polymeric material.

Conductive polymeric materials and devices incorporating them are well known.

We have discovered a new conductive polymeric article which can be heat recoverable and used as a heat recoverable cover, and/or can be an electrically powered article.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

Heat recoverable articles are known. In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form. In other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent 1,440,524 in which an outer tubular elastomeric member is held in a stretched state by an inner tubular member. Alternatively, the "hold-out" layer could be on the outside.

Heat-recoverable articles which comprise conductive polymeric materials, and which use ohmic heating of those materials to cause heat recovery are also known. Reference may be made for example to GB 1265194 (MP099), U.S. Pat. Nos. 4,085,286 (MP192), 4,017,715 (MP0212), 4,421,582 (MP0219), 4,853,165 (MP0922) and 4,570,055 (MP0939).

It is also known to be desirable to use for a conductive recoverable article, a material which exhibits a PTC (positive temperature coefficient of resistivity) effect, that is a sharp rise in resistivity at a particular, or over a short range of temperatures. This temperature or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

An article according to the invention is tubular and has elongate electrodes extending along its length which when connected to a source of electrical power causes electrical current to flow between the electrodes around the circumference of the article. In order to heat and/or recover selected parts only of the article, the electrode (which extends along the entire length of the article) may be interrupted.

Thus, a first aspect of the invention provides a tubular article comprising conductive polymeric material having two or more elongate electrodes extending at least part way along the length of the article, at least one of which elongate electrodes is interrupted so that an electrical power source can be selectively connected to the article to cause electrical current to pass through a first length only of the article.

The term "interrupted" means that there is a discontinuity in the length of the electrode. The interrupted electrode may have been made by starting with a longer continuous electrode and removing part of its length (other than at one end). Alternatively the "interrupted" electrode may be made by applying two discrete electrode lengths. There is no direct, low resistance, electrical connection between the parts of the interrupted electrode.

Tubular articles according to the invention may be of open (wraparound) or closed cross-section. When tubular articles are used they may be open at one or both ends.

As used herein the term "wraparound" means a cover which can be wrapped around a substrate, with longitudinal edges secured together to form a tubular article around the substrate. The term does not include wrapped tape.

A feature of this article is that it can be made in a continuous process in long lengths and then later cut to the desired length.

The above arrangement enables the first length of the interrupted electrode(s), on one side of the interruption, to be connected to a source of electrical power independently of the remaining part of the electrode. Several interruptions may be made in the electrodes if desired. This invention is advantageous where it is desirable to heat or recover only one part of the tubular article, or where it is desired to heat or recover that portion at a different time. For example, one part of an article may be heated to activate or cure an underlying adhesive or sealant before a second part is heated. One or more parts of the article can be used to deliver adhesive or sealant to an area before another part of the article is heated.

The article according to the invention may be expanded to render it recoverable or it may be non expanded, and hence heat-stable. Thus the article may be a recoverable cover and/or heater or a heat stable heater.

British Patent Application 8810522, U.S. Ser. No. 241,749, describes a heat recoverable article (preferably tubular) which comprises electrically conductive recoverable material, and is provided with at least two integrally formed spaced apart support elements. The support elements also comprise electrically conductive material and are dimensionally heat stable, so that they remain undeformed during recovery, other than bending to accommodate transitions. The arrangement ensures good contact is maintained throughout recovery of the article. This arrangement is suitable for use in the present invention, the electrodes (which are interrupted, or are to be interrupted) being positioned on or in the support elements, which are typically in the form of elongate flanges.

British Patent Application 8723760 (DK004 GB3) describes a heat recoverable conductive polymeric, preferably tubular, article with longitudinal electrodes extending part way only along its length.

British Patent Application 8814688, and application DK005 FF, U.S. Ser. No. 242,081, filed contemporaneously herewith, disclose articles comprising a material with specific electrical properties to control the direction of current flow. One article according to DK005 has been expanded from X % to Y % to make it heat recoverable, the article comprising a conductive polymeric material the resistivity of which decreases on expansion, as measured in the direction of current flow, in at least part of the X-Y % expansion range. Another article according to the invention is heat recoverable and comprises a conductive polymeric material which has a resistivity which increases on recovery, as measured in the direction of current flow, throughout the temperature range 20° C. to $T_e$ (extrapolated end temperature, as measured according to ASTM D3418-82).

Other articles according to that invention have a so-called pseudo-PTC ratio (peak resistivity: resistivity at 25° C. in the range 1½ to 10, and are connected to electrodes so that current flows parallel to the faces of the article. Preferred articles are expanded to render them recoverable and the resistivity of the composition of the articles decreases in at least part of the expansion range when expanded by 25% or more, for example by 25-500%.

British Patent Application 880072, (RK352-A-GB1), U.S. Ser. No. 255,077, describes a tubular article which comprises a conductive polymeric material and is preferably heat recoverable and which can apply a radially inward force on a substrate therein. This can be used to join or repair a substrate e.g. a cable or a pipe. It can, for example, melt a polymeric patch between the article and the substrate. It is preferably multi-part or wrap-around, for easy installation.

British Patent Application 8723762 (DK006 GB), U.S. Ser. No. 241,659, describes a tubular conductive polymeric article which has particular application as a duct seal, and which increases in thickness on recovery. It preferably has three longitudinal sections, which are all electroded separately. The end sections shrink radially, and the central section increases in thickness. According to the present invention, the longitudinal sections may comprise interrupted elongate electrodes.

The interrupted electrodes of the present invention may be used in any of the above described articles.

As mentioned above, in preferred embodiments the electrodes are provided in or on longitudinal flanges extending along the length of the article. Such an arrangement is described in British Patent Application No. 8810522 (DK003 GB5), U.S. Ser. No. 241,749. In these cases the interruption in the electrodes is preferably effected by making a cut through the flanges and associated electrodes, so that there is an electrically insulating space between the cut ends of the electrode.

A second aspect of the invention provides a method of making a selectively heatable or selectively recoverable tubular article comprising:
(a) forming a tubular article comprising conductive polymeric material,
(b) providing two or more longitudinal electrodes extending along the article,
(c) interrupting the electrical continuity of at least one electrode, thereby defining a first electrode part which can be connected to an electrical power source and a remaining electrode part which can be separately connected to an electrical power source.

In a preferred embodiment the tubular article is provided with longitudinal conductive polymeric flanges extending along at least part of the length of the article, and the electrodes are provided in or on these flanges. In this case the electrical continuity of the electrode(s) may be interrupted, for example, by cutting and removing a section of each flange, part-way along the length of the electrode(s). Where the electrodes are provided on the surface of the flanges or the surface of the body of the article, e.g. by silver conductive ink or paint, they may be mechanically removed, e.g. by abrading.

As an alternative the electrodes may be provided interrupted in the first instance. Thus a third aspect of the invention provides a selectively heatable or selectively recoverable tubular article comprising:
(a) a tubular article comprising conductive polymeric material, and
(b) three or more longitudinal electrodes extending along the article, at least two or which extend along the same line but are separated from each other.

The two electrodes that are separated from each other may nonetheless be electrically connected via a higher resistivity medium (i.e. the conductive polymeric material of the main body of the article). There is however no direct low resistance electrical connection between the electrodes. Also there may be a mass of insulating material between the separated electrodes.

The invention also provides a method of making this article comprising providing the constituent parts thereof.

A fourth aspect of the invention provides a method of using the article according to the second and third aspects of the invention for independently heating/recovering the separated sections. Thus this aspect provides a method of selectively heating or recovering a tubular article, comprising connecting the said first part of each electrode to cause current to flow between said first parts, and optionally separately connecting the remaining parts, of each electrode to an electrical power source to cause electrical current to flow between said remaining electrode parts.

The concept of independently electroding and heating/recovering different sections of a conductive polymeric article is believed novel per se. This may be done with longitudinal electrodes as described with reference to aspects one, two and three of the present invention.

Preferred compositions for use in the present invention are described in copending commonly assigned application Ser. No. 241,660, filed Sept. 8, 1988, which is incorporated herein by reference.

One material the can be used is 59.4 parts by weight Elvax 460 (an E.V.A. of 18% by weight vinyl acetate content and a melt flow index of 2.5, as supplied by Du Pont), 39.6 parts by weight of Vulcan P (a carbon black supplied by Cabot Corporation) and 1 part by weight antioxidant. Other suitable examples are:

| Polymer (parts by weight) | Carbon Black (parts by weight) | Antioxidant (parts by weight) |
|---|---|---|
| Marlex* HXM 50100 (59.4) | Vulcan* P (39.6) | (1.0) |
| Elvax* 460 (59.4) | Sevalco* N110 (39.6) | (1.0) |
| Sclair* 11D-1 (59.4) | Ensaco* MS (39.6) | (1.0) |
| Elvax* 770 (59.4) | Vulcan* P (39.6) | (1.0) |

*represents a trademark.

The polymeric materials used as follows:

Marlex is a HDPE supplied by Phillips

Elvax 460—described earlier

Sclair 11D-1 is a LLDPE supplied by Du Pont, Canada

Elvax 770 is an EVA supplied by Du Pont.

Vulcan P, Ensaco MS and Sevalco N110 carbon blacks are supplied by Cabot Corporation, Ensagri Willebroek NV and Sevalco Ltd respectively.

One preferred article according to the invention is a tubular article which has been expanded radially and has two or more, preferably three separately radially shrinkable sections. The article preferably comprises longitudinally separated pairs of electrodes (one pair for each separately radially shrinkable section) arranged to shrink each of the sections. One example of such an article is for cable blocking a cable splice, e.g. a splice between optical fibres. For this application there are three separately radially shrinkable sections. The central section contains a large mass of adhesive or other sealant, for cable blocking. The end sections are lined with adhesive, e.g. a hot melt adhesive, for bonding to the cables.

For cable blocking and similar applications, there is not necessarily a requirement for the inner surface of the article to be smooth (since the substrate may not be). Thus in the preferred case where the electrodes are provided on heat stable flanges projecting from the surface of the article (as described in British Patent Application 8810522 (DK003 GB5) these flanges may project outwardly from or inwardly into the article, or both.

Another preferred article, which is recoverable, comprises a conductive polymeric hold-out layer which holds in a stretched state an elastomeric layer. The hold-out layer may be the inner or outer layer. The elastomeric layer is allowed to recover when the conductive layer heats.

Where the article is tubular with one or more open ends, it may be desirable to seal between two or more substrates exiting the open end. This can be achieved using a branch-off clip (e.g. as disclosed in U.S. Pat. No. 4,648,924) which brings together circumferentially spaced portions of the walls of the article between the substrates. Preferably an electrically heated branch-off clip is used. As an alternative an electrically heated filling piece may be used. The electrically heated clip and filling piece may be powered by the same power supply that is used to heat and recover the article.

In articles according to the invention, the wall thickness of the article may be varied along its length. Also two or more layers of different materials may be used. The second or additional layer may extend along the whole or along part of the length of the article. They may have electrical properties e.g. room temperature resistivity and resistivity/temperature behaviour, that are the same as, or different to, that of the first material. As an example, the second or subsequent layers may comprise a material that exhibits traditional PTC behaviour or ZTC (zero temperature coefficient of resistivity) behaviour. The effect of the additional layer(s) is that it (they) provide additional material through which electrical current can flow, and hence provide additional heating. By appropriate choice of the resistivity of the material of the additional layer(s) greater heating can be achieved than would be the case were a similar additional thickness of the first material used This may be advantageous, for example to decrease recovery times in certain regions, or where a higher temperature is required. Therefore in some preferred embodiments second or subsequent layers of material different to the first material are added in selected regions.

Another example of using two layers of different materials is where certain properties, e.g. flame retardancy, solvent resistance, abrasion resistance, electrical insulation, impact resistance, colour coding are required.

Where two or more layers are used these may be applied separately, for example by sequential extrusion or may be co-extruded.

The present invention may be utilized in a variety of articles of different shapes. They are generally tubular, including wraparounds, and may be open at one or both ends.

Embodiments of the invention will now be described by way of example with reference to the accompanying drawings wherein:

FIG. 1 shows a recoverable article according to the invention;

FIG. 2 shows the article of FIG. 1, with separated electrodes;

FIG. 3 shows the article of FIG. 2, one end of which has been recovery onto a substrate; and Referring now to the drawings, FIG. 1 shows a tubular article 2 and comprising a conductive polymeric material. The main body of the article has been expanded to make it recoverable. Electrodes 4 in the form of wires 4 extend in heat stable conductive polymeric flanges 6 along the length of the article.

FIG. 2 shows the article of FIG. 1, in which the electrodes have been interrupted by a notch 8. This enables section 10 (to the left of notch 8 in the drawings) to be heated/recovered independently of part 12 (to the right of notch 8 in the drawings.) Notch 8 can be made with a suitable cutting tool.

The flanges 6 are cut back at one end to bare projecting portions 4 which can be connected to a power source 15. As an alternative method of contacting the electrodes, insulation—displacement type devices could be used.

FIG. 3 shows the article 2' with one end 10' recovered onto pipe 16, (superscript indicates recovered part).

The disclosures of the following specifications filed contemporaneously herewith are also incorporated herein by reference: DK003, U.S. Ser. No. 241,749, DK004, U.S. Ser. No. 242,089, DK005, U.S. Ser. No. 242,081, DK006, U.S. Ser. No. 241,659, RK352-A, U.S. Ser. No. 255,007, RK365, U.S. Ser. No. 241,660.

We claim:

1. A radially heat-shrinkable tubular article which comprises
    (1) a component comprising a conductive polymer, and
    (2) at least three spaced-apart elongate electrodes, each of which extends at least part way along the length of the component and is connectable to an electrical power source, the electrodes being placed so that
        (a) a first set of two or more selected electrodes can be connected to a suitable electrical power source and thus cause electrical current to pass in a circumferential direction through a first part only of the component, and to generate heat within that first part which causes radial shrinkage along a first length of the article only; and (b) a second set of two or more selected electrodes can be connected to a suitable electrical power source and thus cause electrical current to pass in a circumferential direction through a second part only of the component and to generate heat within that second part.

2. An article according to claim 1, wherein the conductive polymer component includes longitudinal support elements which are composed of a conductive polymer, which are not heat recoverable and to which the electrodes are secured.

3. An article according to claim 2, wherein the support elements are flanges which extend outwardly from the tubular article and at least two of the electrodes are secured to flanges which extend along the same line.

4. An article according to claim 1 which comprises, coated on at least part of its internal surface, a thermally responsive material which is an adhesive, a mixture of curable components, or a sealant, and in which, when heat is generated within the first part or the second part of the conductive polymer component, the thermally responsive material undergoes a desired thermal response.

5. An article according to claim 1 wherein generation of heat within the second part of the conductive polymer component causes radial shrinkage along a second length of the article.

6. A method of making a selectively heatable tubular article comprising:
   (a) providing a tubular article which comprises a component comprising a conductive polymer and at least two spaced-apart elongate electrodes, each of which extends at least part way along the length of the component, and
   (b) interrupting the electrical continuity of at least one of the electrodes, thereby defining a first electrode which can be connected to an electrical power source and a second electrode which is spaced-apart from the first electrode and which can be separately connected to an electrical power source.

7. A method according to claim 6, wherein the conductive polymer component includes longitudinal support elements which are composed of a conductive polymer, which are not heat-recoverable and to which the electrodes are secured.

8. A method according to claim 7, wherein the support elements are flanges which extend outwardly from the tubular article, and step (b) comprises removing part of at least one flange having an electrode secured thereto.

9. A method of providing a covering on a substrate which comprises
   (A) providing a substrate and, around the substrate, a radially heat-shrinkable tubular article which comprises
      (1) a component comprising a conductive polymer, and
      (2) at least three spaced apart elongate electrodes, each of which extends at least part way along the length of the component;
   (B) connecting a first set of two or more selected electrodes to an electrical power source, thereby causing electrical current to pass in a circumferential direction through a first part only of the component, and to generate heat within that first part which causes a first length of the article to shrink radially towards the substrate; and
   (C) before, during or after step (B) connecting a second set of two or more selected electrodes to an electrical power source, thereby causing electrical current to pass in a circumferential direction through a second part only of the component and to generate heat within the second part.

10. A selectively heatable or selectively recoverable tubular article comprising:
    (a) a tubular article comprising conductive polymeric material; and
    (b) three or more longitudinal electrodes which extend along the length of the article, and at least two of which extend along the same line but are separated from each other.

11. An article according to claim 10 comprising three selectively heatable and recoverable longitudinal sections, each of which is provided with a pair of longitudinal electrodes which can be connected to an electrical power source and which are arranged so that electrical current flows around the circumference of the article, each of the pairs of electrodes being separated from the adjacent pair(s) of electrodes, so that each pair can be separately connected to a source of electrical power and hence each of said longitudinal sections heated and/or recovered independently of the other of said sections.

12. An article according to claim 10, wherein one of the sections of the article can be used to deliver adhesive or sealant before a second section is recovered.

13. A method of making a selectively heatable or selectively recoverable tubular article which method comprises:
    (a) forming a tubular article comprising conductive polymer material,
    (b) providing three or more spaced-apart longitudinal electrodes extending along the article, at least two of the electrodes being rectilinear electrodes which lie in the same straight line.

14. An article according to claim 1 which comprises an elastomeric layer in a stretched state, the elastomeric layer being released from its stretched state when heat is generated in the first part of the conductive polymer component.

15. An article according to claim 1 comprising a material which has been expanded by 25% or more to render it recoverable, wherein the material decreases in resistivity in at least part of the expansion range on said expansion, or the material exhibits a pseudo PTC ratio in the range $1\frac{1}{2}$-10.

16. An article according to claim 1, wherein at least one end of at least one electrode terminates in a body of conductive polymeric material, thereby defining an inwardly directed electrode end.

* * * * *

UNITED STATES PATENT AND TRADEMARK OFFICE
CERTIFICATE OF CORRECTION

PATENT NO. : 5,013,894
DATED : May 7, 1991
INVENTOR(S) : Jensen, et. al.

It is certified that error appears in the above-indentified patent and that said Letters Patent is hereby corrected as shown below:

Column 2, line 67, after "(DK004 GB3)" insert --U.S. Serial No. 242,089--.

Column 3, line 28, replace "880072, "by --8805072,--.

Signed and Sealed this

Seventeenth Day of August, 1993

Attest:

BRUCE LEHMAN

*Attesting Officer*    *Commissioner of Patents and Trademarks*